United States Patent [19]

Hagenmeyer et al.

[11] Patent Number: 5,616,868
[45] Date of Patent: Apr. 1, 1997

[54] CORIOLIS-TYPE MASS FLOW SENSOR WITH A SINGLE MEASURING TUBE

[75] Inventors: Heinrich Hagenmeyer, Rheinfelden; Alfred Wenger, Neftenbach, both of Germany

[73] Assignee: Endress & Hauser Flowtec AG, Reinach, Switzerland

[21] Appl. No.: 646,123

[22] Filed: May 7, 1996

[30] Foreign Application Priority Data

Jun. 14, 1995 [EP] European Pat. Off. .............. 95109152

[51] Int. Cl.⁶ ..................................................... G01F 1/78
[52] U.S. Cl. ............................... 73/861.357; 73/861.355
[58] Field of Search ....................... 73/861.355, 861.356, 73/861.357

[56] References Cited

U.S. PATENT DOCUMENTS

| | | |
|---|---|---|
| 4,949,583 | 8/1990 | Lang et al. . |
| 5,381,697 | 1/1995 | Van Der Pol ....................... 73/861.356 |
| 5,476,013 | 12/1995 | Hussain et al. ..................... 73/861.357 |
| 5,497,665 | 3/1996 | Cage et al. ......................... 73/861.356 |

FOREIGN PATENT DOCUMENTS

| | | |
|---|---|---|
| 0317340 | 5/1989 | European Pat. Off. . |
| 0316908 | 5/1989 | European Pat. Off. . |
| 0578113 | 1/1994 | European Pat. Off. . |
| 0598287 | 5/1994 | European Pat. Off. . |

OTHER PUBLICATIONS

H. Hagenmery et al., "FLOMEKO '94—7th International Conference on Flow Measurement", Glasgow, Scotland, Jun. 1994, pp. 1–7.

*Primary Examiner*—Richard Chilcot
*Assistant Examiner*—Jewel Artis
*Attorney, Agent, or Firm*—Bose McKinney & Evans

[57] ABSTRACT

To achieve high measurement accuracy of Coriolis-type single-tube hoop-mode mass flow sensors for nonideal fluids, such a mass flow sensor comprises a vibrating system containing a single straight measuring tube as a main vibrator and an auxiliary vibrator which does not come in contact with the fluid and is mechanically coupled to the measuring tube via connecting elements, the vibrating system being so excited in a natural frequency of vibration by means of at least one exciter that the measuring tube vibrates in a hoop mode. The mass flow sensor further comprises a support tube, to which the vibrating system is attached at the ends and via which the vibrating system is connected with a conduit, and sensors for the inlet-side and outlet-side vibrations of the measuring tube. The vibrating system is so designed that its kinetic energy is at least twice as high as that of the measuring tube. The connecting elements are so designed and arranged that hoop modes of the measuring tube caused by Coriolis forces are transmitted to the auxiliary vibrator as little as possible.

3 Claims, 2 Drawing Sheets

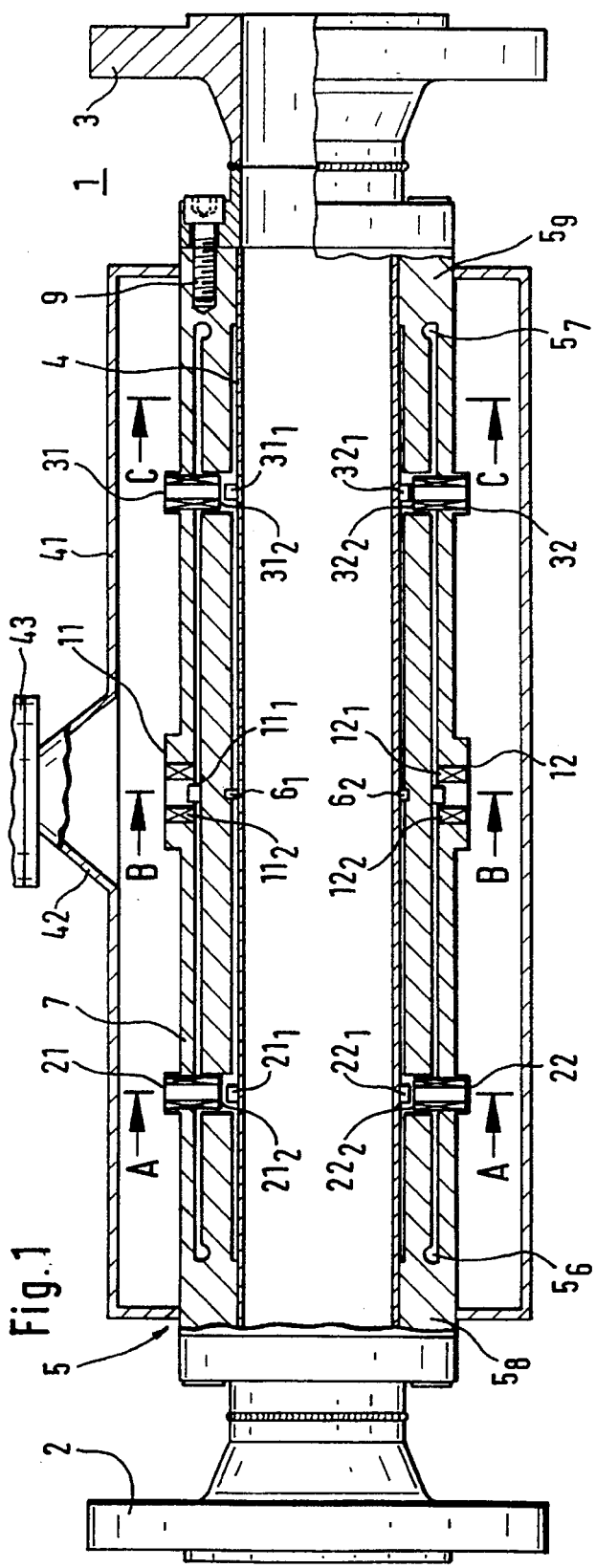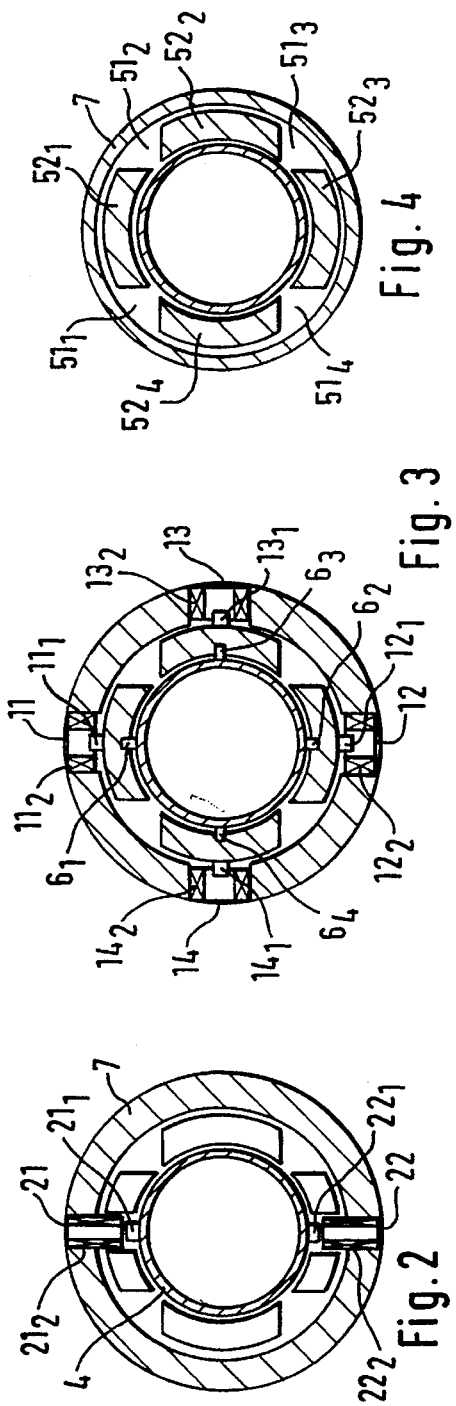

CORIOLIS-TYPE MASS FLOW SENSOR WITH A SINGLE MEASURING TUBE

FIELD OF THE INVENTION

The present invention relates to Coriolis-type mass flow sensors having a single measuring tube which vibrates in a hoop mode.

BACKGROUND OF THE INVENTION

EP-A-317 340 discloses a Coriolis-type mass flow sensor which can be installed in a conduit and through which a fluid to be measured flows during operation, comprising a vibrating system containing
  a single straight measuring tube which is traversed by the fluid, and
  two node masses extending along the measuring tube and attached to the latter at the ends, the weight of the node masses being so distributed
    that their center of gravity is located at the center of the axis of the measuring tube,
  the vibrating system being excited during operation of the mass flow sensor into stringlike vibration by means of at least one exciter,
a support, particularly a support tube, to which the vibrating system is attached at the ends via bellows and by which the vibrating system is connected with the conduit, and
at least one sensor for the inlet-side vibrations of the measuring tube and at least one sensor for the outlet-side vibrations of the measuring tube.

This mass flow sensor cannot be fully dynamically balanced for all fluid densities, nor is it of a particular compact design, i.e., nor does it have as short an overall length as possible.

In EP-A-316 908 (=U.S. Pat. No. 4,949,583) and in an article by H. Hagenmeyer et al., "Design of an Advanced Coriolis Mass Flowmeter Using the Hoop Mode", published in the proceedings of "FLOMEKO '94, 7th International Conference on Flow Measurement", Glasgow, June, 1994, a Coriolis-type mass flow sensor is described which can be installed in a conduit and through which a fluid to be measured flows during operation, comprising a single straight measuring tube which is traversed by the fluid and
  which during operation of the mass flow sensor is so excited in one of its natural frequencies of vibration by means of at least one exciter
  that it vibrates in a hoop mode,
a support, particularly a support tube, to which the measuring tube is attached at the ends and by which the measuring tube is connected with the conduit, and
at least one sensor for the inlet-side vibrations of the measuring tube and at least one sensor for the outlet-side vibrations of the measuring tube.

Investigations have shown, however, that in the case of nonideal fluids, particularly nonhomogeneous fluids, multicomponent fluids, high-viscosity fluids, and highly compressible fluids, such mass flow sensors, in which the measuring tube vibrates in a hoop mode, have a considerably greater measurement error, and therefore are much more inaccurate, than mass flow sensors of the first-mentioned type with a measuring tube vibrating in the manner of string.

This is due to the fact, inter alia, that the main vibrator, consisting of the measuring tube with the fluid to be measured, loses vibrational energy in an irreversible manner, e.g., through sound radiation to the environment. The amount of energy $dE/E$ lost per cycle is inversely proportional to the quality factor Q of the vibrating system in the actual vibration mode:

$$(dE/E)_{cycle} \sim 1/Q. \tag{1}$$

SUMMARY OF THE INVENTION

To minimize the above-mentioned measurement errors, i.e., to increase the measurement accuracy even for the above-mentioned nonideal fluids, it is therefore necessary to make the quality factor Q as large as possible.

To accomplish this, the invention provides a Coriolis-type mass flow sensor which can be installed in a conduit and through which a fluid to be measured flows during operation, comprising:

a vibrating system containing
  a single straight measuring tube which is traversed by the fluid and acts as a main vibrator, and
  an auxiliary vibrator which does not come in contact with the fluid and
    which is mechanically coupled with the measuring tube via connecting elements,
  the vibrating system being so excited during operation of the mass flow sensor in one of its natural frequencies of vibration by means of at least one exciter that the measuring tube vibrates in a hoop mode;
a support, particularly a support tube, to which the vibrating system is attached at the ends and by which the vibrating system is connected with the conduit; and
at least one sensor for the inlet-side vibrations of the measuring tube and at least one sensor for the outlet-side vibrations of the measuring tube,
  the vibrating system being so designed
    that its kinetic energy is at least twice as high as the kinetic energy of the main vibrator, and
    the connecting elements being so designed and arranged
      that hoop modes of the measuring tube caused by Coriolis forces are transmitted to the auxiliary vibrator as little as possible.

The invention is predicated on recognition that it is not sufficient to make the quality factor as large as possible by appropriate mechanical design—which determines the term dE in the above proportionality—, but that the quality factor can be further increased by increasing the term E in the above relation (1), which is accomplished in the invention by incorporating an auxiliary vibrator.

The quality factor $Q'$ of this vibrating system can be expressed as a function of the vibration frequency f:

$$1/Q' = c_1 f^{1/2} + 2c_2 f^s, \tag{2}$$

where $c_1$, $c_2$ are constants, and s is a number between 2 and 4. The first term describes the viscosity-induced energy loss, and the second term the energy loss due to sound radiation. This term, viewed purely mathematically, quickly predominates over the first term with increasing frequency f, but the auxiliary vibrator provided in accordance with the invention contributes substantially to the fact that the frequency f remains low.

In a preferred embodiment of the invention in which the measuring tube vibrates in the (2, 1) hoop mode, the auxiliary vibrator consists of four beams arranged symmetrically with respect to and extending parallel to the axis of the measuring tube and fixed to the ends of the support and the measuring tube, and each of the beams is connected with the middle of the measuring tube via a connecting element provided in the middle of the respective beam.

According to an advantageous feature of this preferred embodiment of the invention, the auxiliary vibrator is a tube provided with four longitudinal slots between its ends.

Through the invention, the advantages of single-tube hoop-mode mass flow sensors, namely their full dynamic balancing capability and their compact design, for example, can be preserved even if the measuring tube has greater nominal widths, particularly above 50 mm, for the above-mentioned nonideal fluids.

BRIEF DESCRIPTION OF THE DRAWINGS

The invention will become more apparent from the following description of an embodiment of the invention when taken in conjunction with accompanying drawings, in which like parts are designated by like reference characters, and in which:

FIG. 1 is a vertical, partially sectioned longitudinal view of the mass flow sensor;

FIG. 2 is a section through the measuring tube and the support taken along line A—A of FIG. 1;

FIG. 3 is a section through the measuring tube and the support taken along line B—B of FIG. 1;

FIG. 4 is a section through the measuring tube and the support taken along line C—C of FIG. 1.

DETAILED DESCRIPTION OF THE DRAWINGS

Figure 5:
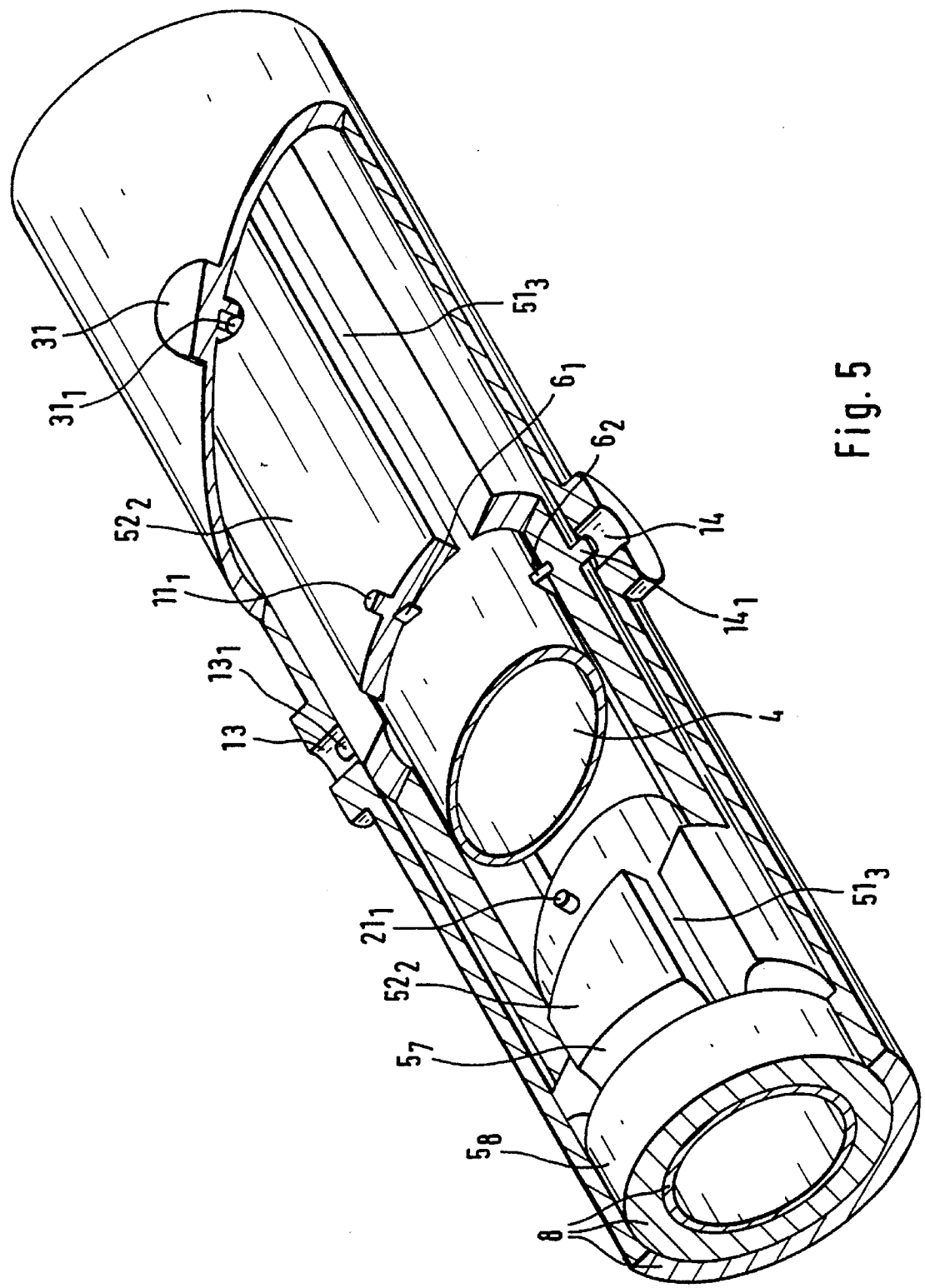
FIG. 5 is a cutaway perspective view of parts of the mass flow sensor of FIG. 1.

The mass flow sensor 1 shown in FIG. 1 in a vertical, partially sectioned longitudinal view and in FIGS. 2 to 4 in three different section planes perpendicular to the axis is additionally illustrated in a perspective view in FIG. 5. In FIG. 5, individual areas can be seen only in part, so that the inner parts actually covered by outer parts are visible. Therefore, FIG. 5 will not be described separately; it only shows the individual parts as seen in perspective and the associated reference characters.

The mass flow sensor 1 can be installed in or connected with a conduit of a given diameter (not shown to simplify the illustration), e.g., via flanges 2, 3, the conduit carrying a fluid to be measured.

The mass flow sensor has a vibrating system which contains a single straight measuring tube 4 as a main vibrator, which is traversed by the fluid, and an auxiliary vibrator 5, which does not come in contact with the fluid. In the figures of the drawing, this auxiliary vibrator 5 preferably has the shape of a tube with four longitudinal slots, so that four beams $52_1$, $52_2$, $52_3$, $52_4$ are obtained in the areas of the-slots $51_1$, $52_2$, $51_3$, $51_4$, cf. specifically FIG. 4.

Through this mechanical design of the auxiliary vibrator 5, the kinetic energy of the vibrating system is at least twice as high as the kinetic energy of the main vibrator, i.e., the measuring tube 4.

The auxiliary vibrator 5 is mechanically connected with the measuring tube 4 via connecting elements designed and arranged in such a way that hoop modes of the measuring tube 4 caused by Coriolis forces are transmitted to the auxiliary vibrator 5 as little as possible.

In the preferred embodiment shown in the figures, four such connecting elements $6_1$, $6_2$, $6$, $6_4$ are provided. They are located in the middle of the measuring tube 4 and spaced by 90° along its circumference, see specifically FIG. 3.

The ends of the measuring tube 4 are fixed, preferably vacuum-tight, e.g., welded, soldered, or press-bonded using a roller, in the respective ends $5_8$, $5_9$ of the auxiliary vibrator 5, the press-bonding being described in applicant's prior, still unpublished EP Application 95 810 199.0 (corresponding to U.S. application Ser. No. 08/434,070, filed May 3, 1995).

The ends $5_8$, $5_9$ of the auxiliary vibrator 5 are, in turn, fixed in the associated ends of a support, which is preferably designed as a support tube 7, as shown in the figures.

To isolate the resonant portions of the auxiliary vibrator 5 from its nonresonant portions, i.e., from the ends $5_8$, $5_9$, annular grooves $5_6$, $5_7$ are provided in transition regions from the resonant portions to the respective ends. These annular grooves $5_6$, $5_7$ are formed near the outer surface of the auxiliary vibrator 5.

In the embodiment, measuring tube 4, auxiliary vibrator 5 in the form of the tube provided with four slots to form the four beams $51_1$, $52_2$, $51_3$, $51_4$, and support tube 7 are arranged coaxially, see FIGS. 2 to 5.

The flanges 2, 3 are attached to the respective ends of measuring tube 4, support tube 7, and auxiliary vibrator 5, namely to the respective common end faces 9 formed by these parts (cf. FIG. 5), by means of screws, one of which, a screw 8, can be seen in the cross-sectional view on the upper right.

During operation, the vibrating system with the measuring tube 4 and the auxiliary vibrator 5 is so excited in one of its natural frequencies of vibration by means of an exciter that the measuring tube 4 vibrates in a hoop mode, preferably in the (2, 1) hoop mode. By contrast, the beams $52_1$, $52_2$, $52_3$, $52_4$ of the auxiliary vibrator 5 are excited (only) into stringlike flexural vibrations via the connecting elements $6_1$, $6_2$, $6_3$.

As means which excite the measuring tube 4 into such resonance hoop-mode vibrations, two electrodynamic exciters 11, 12 and two electrodynamic detectors 13, 14 are provided in the embodiment. The exciters 11, 12 and the detectors 13, 14 are arranged along the circumference of the support tube 7 midway between the end faces 9, cf. FIGS. 1, 3 and 5.

The exciters 11, 12 and the detectors 13, 14 are located on respective cross-sectional diameters of the support tube 7 which are perpendicular to each other.

Each exciter 11, 12 and each detector 13, 14 comprises a respective permanent magnet $11_1$, $11_2$, $11_3$, $11_4$ mounted on the auxiliary vibrator 5 and a respective coil $12_1$, $12_2$, $12_3$, $12_4$ mounted on the support tube 7, the permanent magnet extending into and being movable to and fro in the associated coil. Thus, two opposite permanent magnets are also located on one of the aforementioned cross-sectional diameters, just as two opposite connecting elements $6_1$, $6_2$ and $6_3$, $6_4$, respectively.

To excite a hoop mode of the measuring tube 4, the coils $12_1$, $12_2$ of the exciters 11, 12 are supplied with a drive current from a suitable drive circuit which is controlled by signals from the coils $12_3$, $12_4$ of the detectors 13, 14. Details of this circuit are outside the scope of the invention, since the latter deals exclusively with the mechanical design of the mass flow sensor.

Furthermore, at least one sensor is provided for the inlet-side vibrations of the measuring tube 4, and at least one sensor for the outlet-side vibrations. These sensors are spaced along the measuring tube 4, preferably the same distance from the exciters.

In the embodiment, a first pair of electrodynamic sensors 21, 22 is provided on the inlet side, and a second pair of electrodynamic sensors is provided on the outlet side. The two sensors are arranged along the circumference of the measuring tube 4 on a cross-sectional diameter, and are aligned with the respective exciters in the axial direction of the measuring tube, cf. FIGS. 1, 2, and 5. Thus, the exciter 11 and the sensor 21, for example, are located on a straight line which is parallel to the axis of the mass flow sensor.

Each sensor comprises a permanent magnet $21_1$, $22_1$, $31_1$, $32_1$, mounted on the measuring tube 4, and a coil $21_2$, $22_2$, $31_2$, $32_2$, mounted on the support tube 7. The permanent magnets extend into and are movable to a fro in the respective coils.

The signals generated by the sensors are processed into a mass flow signal in a suitable evaluating circuit, whose details, like those of the drive circuit, are outside the scope of the invention.

FIG. 1 also shows a housing 41 which is fixed to the support tube 7 and serves, inter alia, to protect lines which are connected to the exciters and the sensors but are not shown to simplify the illustration. The housing 41 has a necklike transition portion 42 to which an electronic housing 43 (shown only in part) for receiving the entire drive and evaluation electronics of the mass flow sensor 1 is fixed.

Following are characteristic values of two implemented mass flow sensors A, B (measuring tube 4 of titanium, auxiliary vibrator 5 of steel 1.4301) in the form of two tables.

In Table 2,

"measuring tube 4 alone"=a measuring tube vibrating in the (2, 1) hoop mode without the auxiliary vibrator mechanically coupled thereto $E_{kin}{}^4$=kinetic energy of the measuring tube "alone"

$E_{kin}{}^{4+5}$=kinetic energy of the overall vibrating system $E_{ela}{}^4$=elastic energy of the measuring tube "alone"

$E_{ela}{}^{4+5}$=elastic energy of the overall vibrating system

TABLE 1

|  | A | B |
| --- | --- | --- |
| Diameter of measuring tube 4 | 84 mm | 84 mm |
| Wall thickness of measuring tube 4 | 2 mm | 2 mm |
| Cross section of the four beams $52_1$, $52_2$, $52_3$, $52_4$ | 60 × 15 mm | 40 × 10 mm |
| Vibration length of measuring tube 4 and of the four beams $51_1$ . . . | 500 mm each | 500 mm each |

TABLE 2

| | A | | | |
| --- | --- | --- | --- | --- |
| Density of fluid in kg/m³ | 0 | 500 | 995 | 1500 |
| Frequency of measuring tube 4 alone in Hz | 757 | 548 | 452 | 392 |
| Frequency of vibrating system in Hz | 345 | 337.9 | 331.1 | 324.6 |
| $E_{kin4+5}/E_{kin4}$ | 20.9 | 11.4 | 8.1 | 6.3 |
| $E_{ela4+5}/E_{ela4}$ | 4.3 | 4.3 | 4.3 | 4.3 |

TABLE 2-continued

| | B | | | |
| --- | --- | --- | --- | --- |
| Density of fluid in kg/m³ | 0 | 500 | 995 | 1500 |
| Frequency of measuring tube 4 alone in Hz | 757 | 548 | 452 | 392 |
| Frequency of vibrating system in Hz | 311 | 297.6 | 285.8 | 275.2 |
| $E_{kin4+5}/E_{kin4}$ | 9.8 | 5.6 | 4.1 | 3.4 |
| $E_{ela4+5}/E_{ela4}$ | 1.6 | 1.6 | 1.6 | 1.6 |

From Table 2 it can be seen that at a constant amplitude of the vibration of the vibrating system, both a considerable increase in the kinetic energy of the vibrating system and a considerable displacement of the vibration frequency can be achieved by coupling the auxiliary vibrator to the measuring tube. This gives the reduction of the vibration frequency required by Equation (2).

We claim:

1. A Coriolis-type mass flow sensor which can be installed in a conduit and through which a fluid to be measured flows during operation, comprising:

a vibrating system containing
   a single straight measuring tube which is traversed by the fluid and acts as a main vibrator, and
   an auxiliary vibrator which does not come in contact with the fluid and
      which is mechanically coupled with the measuring tube via connecting elements,
   the vibrating system being so excited during operation of the mass flow sensor in one of its natural frequencies of vibration by means of at least one exciter that the measuring tube vibrates in a hoop mode;

a support, particularly a support tube, to which the vibrating system is attached at the ends and by which the vibrating system is connected with the conduit; and at least one sensor for the inlet-side vibrations of the measuring tube and at least one sensor for the outlet-side vibrations of the measuring tube, the vibrating system being so designed
   that its kinetic energy is at least twice as high as the kinetic energy of the main vibrator, and
the connecting elements being so designed and arranged
   that hoop modes of the measuring tube caused by Coriolis forces are transmitted to the auxiliary vibrator as little as possible.

2. A mass flow sensor as claimed in claim 1, wherein the measuring tube vibrates in the (2, 1) hoop mode, the auxiliary vibrator consists of four beams arranged symmetrically with respect to and extending parallel to the axis of the measuring tube and attached to the ends of the support and the measuring tube, and each beam is connected to the middle of the measuring tube by a connecting element provided in the middle of the respective beam.

3. A mass flow sensor as claimed in claim 2 wherein the auxiliary vibrator is a tube provided with four longitudinal slots between its ends.

* * * * *